United States Patent [19]

Pan

[11] 4,398,427

[45] Aug. 16, 1983

[54] THIN SHELL PRESSURE SENSOR

[75] Inventor: Robert B. Pan, Houston, Tex.

[73] Assignee: Exxon Production Research Co., Houston, Tex.

[21] Appl. No.: 270,931

[22] Filed: Jun. 5, 1981

[51] Int. Cl.$^3$ ............................................. G01L 7/08
[52] U.S. Cl. ........................................ 73/784; 73/726
[58] Field of Search ................. 73/784, 715, 723, 724, 73/725, 726, 727, 728, 729

[56] References Cited

U.S. PATENT DOCUMENTS

| | | |
|---|---|---|
| 2,995,034 | 8/1961 | Boiten . |
| 3,216,245 | 11/1965 | Seed . |
| 3,286,514 | 11/1966 | Anderson . |
| 3,372,577 | 3/1968 | Bates et al. . |
| 3,455,165 | 7/1969 | Huet ...................................... 73/727 |
| 3,529,468 | 9/1970 | Carlson . |
| 3,548,650 | 12/1970 | Boadle . |
| 4,084,430 | 4/1978 | Boyle et al. . |
| 4,175,445 | 11/1979 | Templeton ............................ 73/768 |

OTHER PUBLICATIONS

Peattie, K. R. et al., The Fundamental Action of Earth Pressure Cells, from Journal of the Mechanics and Physics of Solids, 1954, vol. 2, pp. 141–155.
Brown, S. F., The Performance of Earth . . . Road Research, from Civil Engineering and Public Works Review, Feb. 1971, pp. 160–165.
Templeton, J. S., Measurement of Sea Ice Pressures, Proc. Fifth International Conf. on Port and Ocean Engineering, Norwegian Inst. of Technology, Aug. 18, 1979, pp. 73–87.
Metge, M. et al., On Recording Stresses in Ice, Proceedings of Third International Symposium on Ice Problems, Aug. 21, 1975, pp. 459–468.
Nelson, R. D. et al., Techniques for Measuring Stresses in Sea Ice, Univ. of Alaska, Sea Grant No. 77-1, pp. 9–16, 1977.
Templeton, J. S., Island Defense and Monitoring, Proc. of Technical Seminar on Alaskan Design, Exxon Company, Oct. 15, 1979, pp. 1–13.
Roark, R. J., Formulas for Stress and Strain, 3rd Ed., McGraw-Hill Book Co., 1954, pp. 264–284.
Timoshenko, S. et al., Theory of Plates and Shells, 2nd Ed., McGraw-Hill Book Co., 1959.
Billington, D. P., Thin Shell Concrete Structures, McGraw-Hill Book Co., 1965.

*Primary Examiner*—Jerry W. Myracle
*Attorney, Agent, or Firm*—Keith A. Bell; Richard F. Phillips

[57] ABSTRACT

A thin shell pressure sensor for sensing in situ pressures in a medium in which the sensor is embedded is provided. The sensor operates on the principle that the membrane stresses near the apex of a thin shell under an external pressure load are proportional to the applied pressure. The constant of proportionality is dependent only on the geometry of the sensor.

18 Claims, 9 Drawing Figures

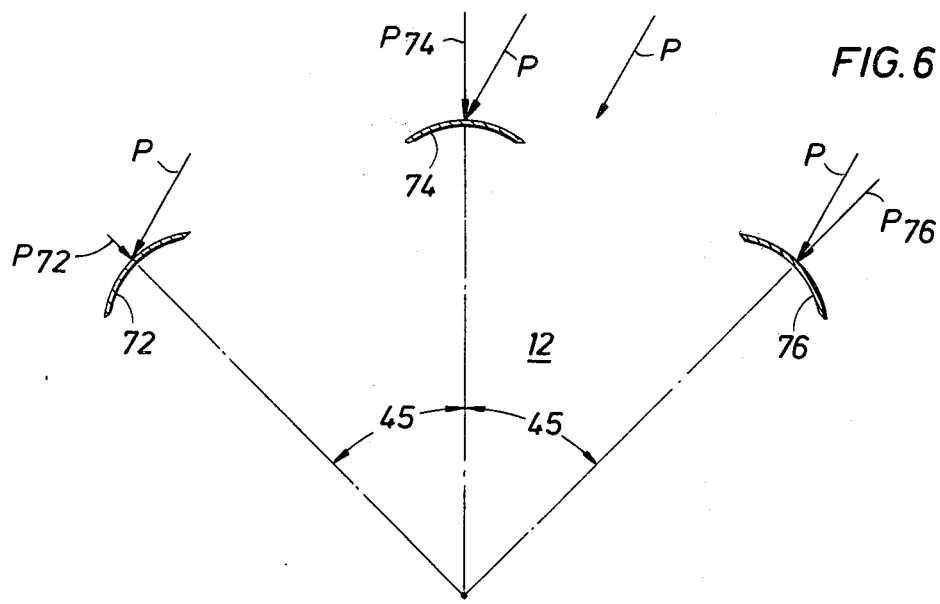
FIG. 6
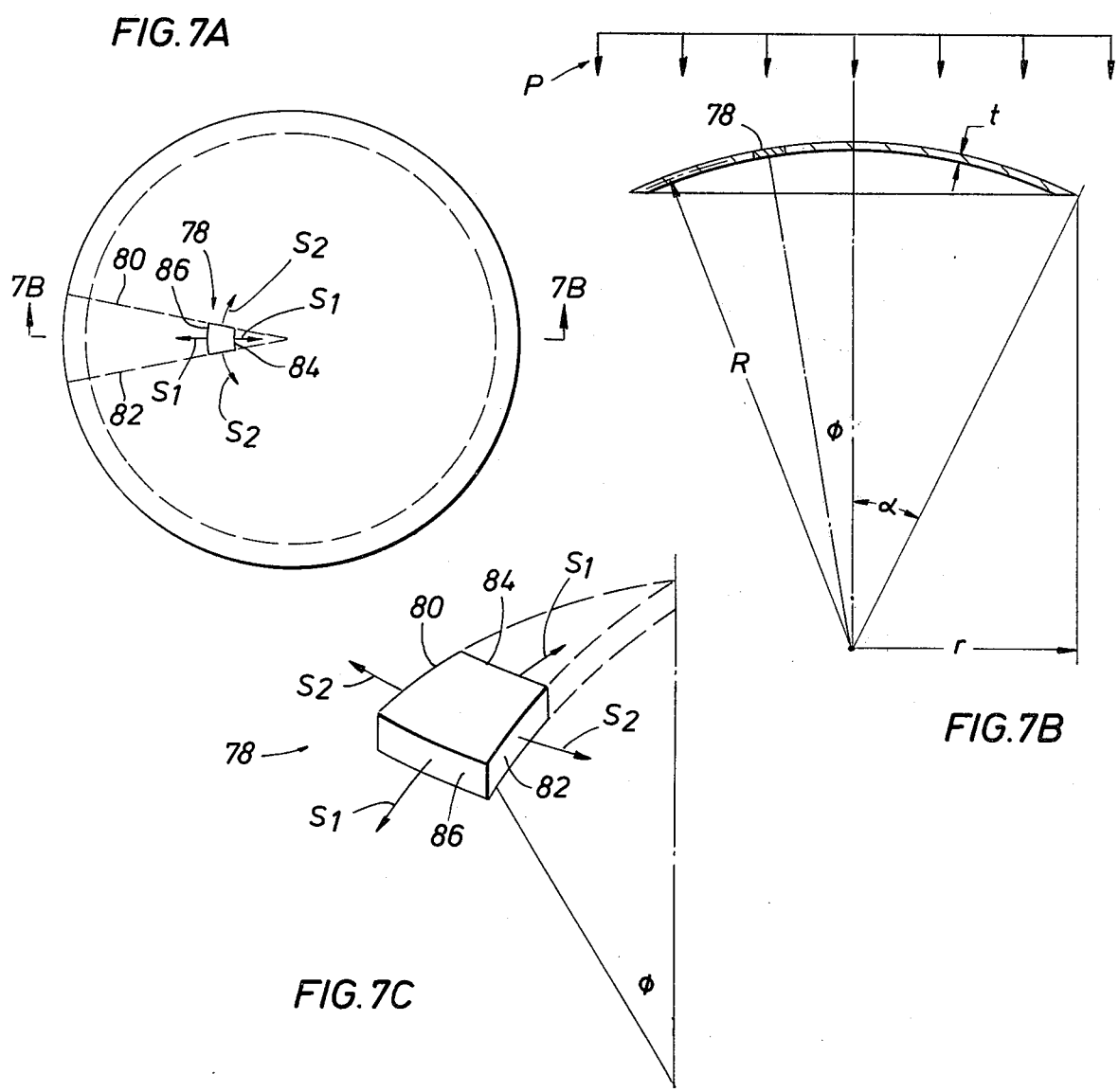
FIG. 7A
FIG. 7B
FIG. 7C

THIN SHELL PRESSURE SENSOR

BACKGROUND OF THE INVENTION

The present invention relates to a pressure sensing device. More particularly, the invention pertains to a thin shell pressure sensor for measuring in situ pressures in a material mass, such as an arctic ice pack, in which the sensor is embedded.

The accurate measurement of pressure forces within a large material mass is important in a variety of applications. For example, accurate prediction of soil pressures and stresses is important in the design of roads, bridges and other structures. Additionally, measurement of pressure within granular bulk materials, such as grain, is important in designing and monitoring storage facilities for such materials.

Due to the rapid increase in exploration for and production of oil, gas and other minerals in arctic offshore regions, the measurement of pressure within an arctic ice pack is of particular importance. Accurate prediction of such pressures is important in determining environmental design criteria for arctic offshore and coastal structures. Additionally, continuous monitoring of such pressures is required for the proper defense of such structures. See, Templeton, J. S., III, "Island Defense and Monitoring", Proceedings of Technical Seminar on Alaskan Beaufort Sea Gravel Island Design, presented by Exxon Company, U.S.A., Anchorage, Alasks, Oct. 15, 1979, and Houston, Tex., Oct. 18, 1979.

Ice pressure must be determined in situ. Samples removed from the ice pack for subsequent laboratory testing are of limited value since the environmental restraints, once removed, are difficult if not impossible to recreate accurately in a laboratory. Measuring pressures in situ reflects what the ice pack is actually experiencing in terms of pressure. Therefore, the need exists for a reliable pressure sensing device which is capable of accurately sensing in situ pressures while embedded in an arctic ice pack.

One device which has been proposed for the use in measuring pressure in an arctic ice pack is disclosed in Metge, M., et al., "On Recording Stresses in Ice", Proceedings of Third International Symposium on Ice Problems, Aug. 18–21, 1975, Hanover, N.H. Metge recommends the use of a sensor whose stiffness is substantially less than the stiffness of the ice. Metge discloses a sensor having an aluminum plate sandwiched between two layers of an elastomeric material which are in turn sandwiched between two outer aluminum plates. The deformation of the sensor is determined by measuring the change in capacitance between the inner and outer aluminum plates. A correlation is then made between the change in capacitance and the applied pressure.

A second ice pressure sensor is disclosed in Nelson, R. D., et al., "Techniques for Measuring Strees in Sea Ice", University of Alaska, Sea Grant No. 77-1, pages 9–16, January 1977. Contrary to Metge, Nelson recommends use of a sensor several times stiffer than the ice surrounding it. The sensor disclosed by Nelson measures sea ice pressure by sensing the compressive stress in a cylindrical metallic rod which is oriented in the ice pack so as to be loaded axially. Due to its high stiffness, this sensor may be insensitive to small variations in pressure. Also, the sensor may give inaccurate readings because its high stiffness allows it to absorb more of the ice pressure load than the surrounding ice.

Still another device which has been proposed for solving the problem of measuring in situ sea ice pressures is described in U.S. Pat. No. 4,175,445 to Templeton (1979). Templeton discloses a pressure sensing device that is thin in comparison to its width and length. Contrary to both Metge and Nelson, Templeton recommends that the sensor have a stiffness similar to the average anticipated stiffness of the embedding medium. The device has a thin central member which is subjected to reverse curvature bending on application of an external pressure. A plurality of wire resistance strain gauges are used to detect strains in the thin central member due to the bending. The pressure acting on the device may be determined from these strains.

Although the above sensors have provided one solution to the problem of measuring in situ sea ice pressures, the need still exists for a compact, easily deployable sensor which would have the sensitivity of a large ice pressure sensor.

SUMMARY OF THE INVENTION

The present invention solves the problem of measuring in situ pressure forces by providing a thin shell pressure sensor which operates on the principle that the membrane stress near the apex of a thin shell under a uniform exterior pressure load is proportional to the applied pressure. The constant of proportionality is dependent only on the geometry of the sensor. Thus, for a given thin shell sensor, the pressure acting thereon may be determined by measuring the membrane stress near the apex of the thin shell using any of several known methods and multiplying that stress by a geometry dependent factor.

In a preferred embodiment, the sensor consists of a segment of a spherical shell having a large radius to thickness (R/t) ratio. The spherical segment is attached to a circular base plate by an annular retaining ring. A primary wire resistance strain gauge is attached to the interior surface of the shell at or near the apex of the segment. This strain gauge is used to record the compressive strain in the shell caused by the external pressure. A second wire resistance strain gauge may be attached to the interior surface of the circular base plate. The purpose of this second strain gauge is to compensate for temperature induced effects in the reading obtained from the primary gauge. As the ice peak presses against the exterior surface of the spherical shell segment, a compressive membrane stress is created in the shell. Near the apex of the shell this compressive membrane stress is insensitive to shell boundary conditions, large temperature variations and direction of loading. The output of the strain gauge may be directly correlated to the compressive strain in the shell which in turn may be directly correlated to the compressive membrane stress. The compressive membrane stress is directly proportional to the normal component of the pressure acting on the sensor. The magnitude of this normal component of pressure is obtained by multiplying the compressive membrane stress by a geometry dependent factor.

In an alternative embodiment, the sensor consists of a segment of a cylindrical shell. The radius of the cylinder is large compared to the shell wall thickness. The cylindrical segment is attached to a base plate by two retaining bars and the longitudinal ends are capped to seal the sensor. A plurality of wire resistance strain gauges are mounted to the interior surface of the cylindrical shell at various points along a longitudinal line through the apex of the segment. The sensor is then embedded in the ice pack with its longitudinal centerline vertical. In this manner the pressure within the ice pack can be determined at a variety of depths. This data is important in determining whether the ice sheet as a whole is being subjected to bending stresses.

Any of several known methods may be used to convert the reading of the strain gauges into a pressure reading. For example, the compressive strain may be calculated from the change in the output current of the strain gauge. This compressive strain may be directly converted into a pressure reading using the known material and geometric properties of the sensor. Alternatively, a mini-computer may be programmed to continuously convert the output of the gauges into a pressure reading.

Due to its compact size and versatility, the pressure sensor of the present invention may be used in a variety of applications. For example, a number of sensors may be embedded in an ice pack to determine environmental design critieria for arctic offshore islands and structures. Since the sensor reads only the normal component of pressure, a cluster of sensors having various angular orientations is used to determine the overall direction and magnitude of the internal ice pressure. The cluster of sensors may be individually embedded in the ice pack, or alternatively, may be integrally mounted to one handling frame for ease of installation. A similar arrangement may be used to monitor pressures acting upon an existing island or structure. Alternatively, the sensor may be mounted directly on the island or structure. Another use of the pressure sensor of the present invention would be to measure the forces applied to the hull of an icebreaking vessel. The sensor would be directly mounted to the hull and woudl continuously record the pressure of the ice pack against the hull. Heretofore pressures have been difficult, if not impossible, to measure.

BRIEF DESCRIPTION OF THE DRAWINGS

FIG. 6 is an illustration of the use of a cluster of thin shell pressure sensors to determine the direction and magnitude of the pressure within the embedding medium.

FIGS. 7A, 7B and 7C illustrate the theory of membrane stresses in a thin shell. FIG. 7A is a top view of a spherical thin shell showing the stresses acting on a small element of the shell. FIG. 7B is a cross sectional side view taken along line 7B—7B of FIG. 7A showing the geometry of the shell. FIG. 7C is a perspective view of the small element showing the stresses acting thereon.

DETAILED DESCRIPTION OF THE PREFERRED EMBODIMENT

The thin shell pressure sensor of the present invention is based on the theory of shell behavior known as membrane theory. The fundamental assumption of membrane theory is that, due to its thinness, the shell is incapable of supporting bending. Thus, under membrane theory all bending stresses in the shell are neglected. For a large area near the apex of the shell, the stresses predicted by membrane theory have proved to be virtually precise. The present invention takes advantage of this phenomenon by providing a pressure sensor which measures in situ pressures in an embedding medium by detecting and measuring membrane stresses in a thin shell. The pressure acting on the sensor may be determined by multiplying the membrane stress by a factor which is dependent only on the geometry of the sensor.

Figure 2:
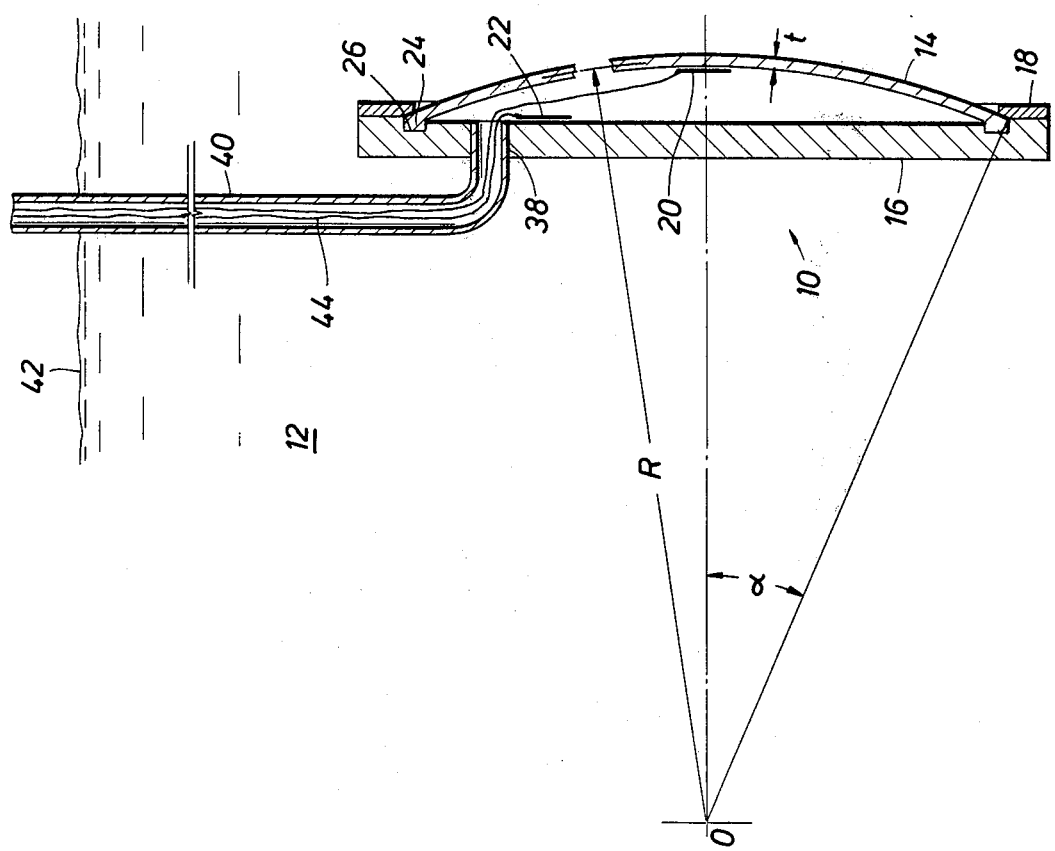
FIG. 2 is a cross-sectional side view of the spherical thin shell pressure sensor of FIG. 1 taken along line 2—2 of FIG. 1.
Figure 1:
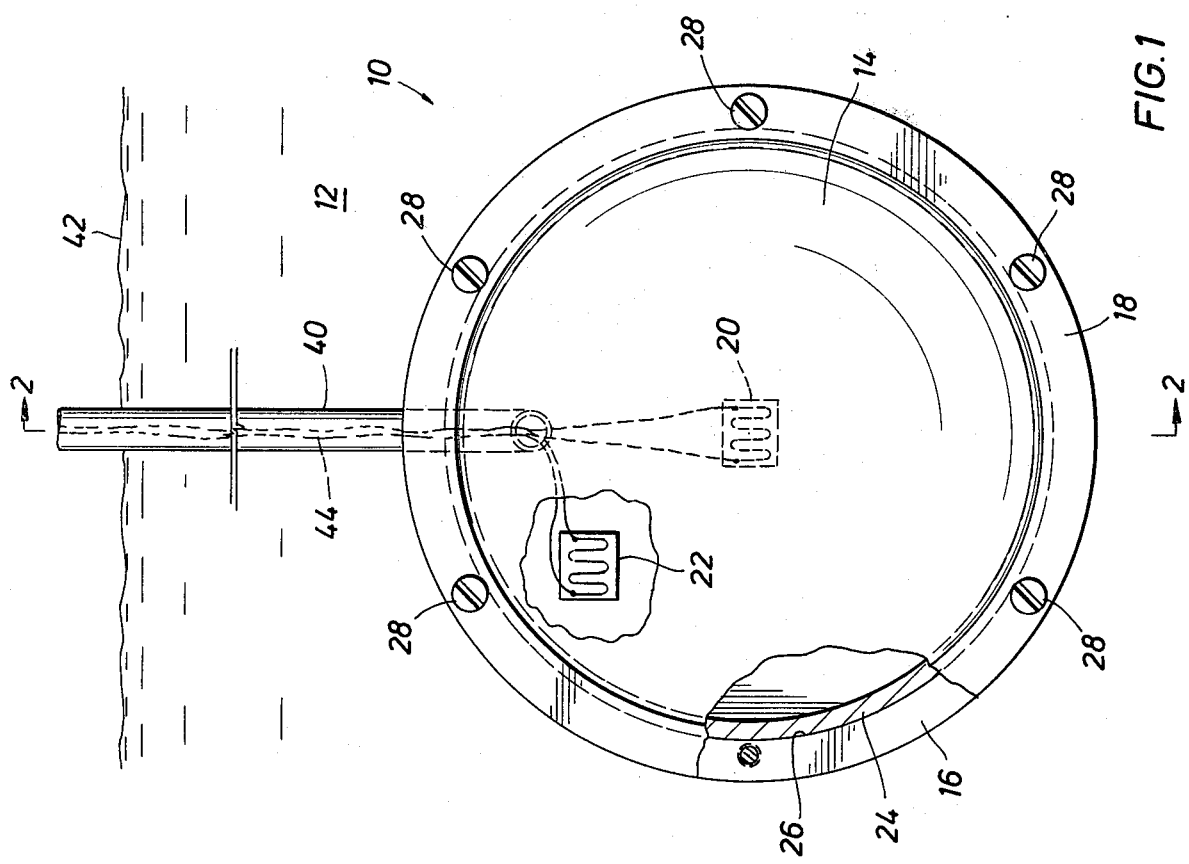
FIG. 1 is an elevational front view of a spherical thin shell pressure sensor in accordance with the present invention.

FIGS. 1 and 2 illustrate a spherical thin shell pressure sensor in accordance with the present invention. Preferably, the sensor is constructed form an elastic, non-corroding material such as aluminum or stainless steel. However, other materials may also be used. The sensor 10 is embedded in a material mass 12 such as an arctic ice pack. The sensor consists essentially of spherical shell segment 14, circular base plate 16, annular retaining ring 18 and two wire resistance strain gauges 20, 22. The spherical shell segment 14 has a large radius to thickness (R/t) ratio. The radius to thickness ratio should be selected so that the stiffness of the sensor is similar to the anticipated stiffness of the embedding medium. Additionally, the spherical shell segment must be designed so that the maximum anticipated pressure in the embedding medium will not cause buckling of the shell wall. The radius (R) of the spherical segment is measured from the spherical center (O) to the mid-point of the shell wall. Thus, the outer surface of spherical shell segment 14 is defined by a sphere having a radius equal to $R+t/2$ and the inner surface by a sphere having a radius equal to $R-t/2$. The cone angle, $\alpha$, which is defined as the angle between the axis of the spherical segment and a line from the spherical center (O) to the outer edge of the outer surface of spherical segment 14, need not be large. Normally, a cone angle of from 15° to 30° will be sufficient. Alternatively, the cone angle may be as high as 90° so that the spherical shell segment 14 is a hemisphere.

An annular shoulder 24 is formed integrally with spherical shell segment 14 at its outer edge. A corresponding annular groove 26 is formed in circular base plate 16. Spherical shell segment 14 is then mated to circular base plate 16 by inserting annular shoulder 24 into annular groove 26. Annular retaining ring 18 is then attached to circular base plate 16 by a plurality of screws 28. The inside diameter of annular retaining ring 18 is slightly less than the outside diameter of spherical shell segment 14 so that the retaining ring overlaps the periphery of spherical shell segment 14. In this manner spherical shell segment 14 is held firmly in place. Other methods of attaching the spherical shell segment to the circular base plate will be readily apparent to those skilled in the art.

Primary strain gauge 20 is firmly attached to the inner surface of spherical shell segment 14. As will be further discussed below, primary strain gauge 20 should be attached at a point near the apex of spherical shell segment 14 and, preferably, should be oriented so that it will measure the strain along a line from the apex of the spherical shell segment to its outer edge. A secondary strain gauge 22 is attached to the inner surface of circular base plate 16 which should be substantially thicker than spherical shell segment 14. The location and orientation of this gauge are not critical to the operation of the sensor. It is only important that secondary strain gauge 22 be attached at a point in the sensor which will experience little or no strain from the applied pressure and the secondary gauge by subjected to the same thermal effects as primary strain gauge 20. With respect to the sensor shown in FIGS. 1 and 2, any location on the inner surface of circular base plate 16 will satisfy these criteria. A hole 38 is formed in circular base plate 16 and a tube 40 is attached to the back side of circular base plate 16 in communicating relation with hole 38. Tube 40 extends from the sensor upwardly through the surface 42 of the material mass 12. Wires 44 which transmit the input and output electrical signals from strain gauges 20, 22 extend from the gauges, through the tube, and connect to a remote readout device (not shown) on the surface of the material mass. Any of several known readout devices may be used.

Figure 3:
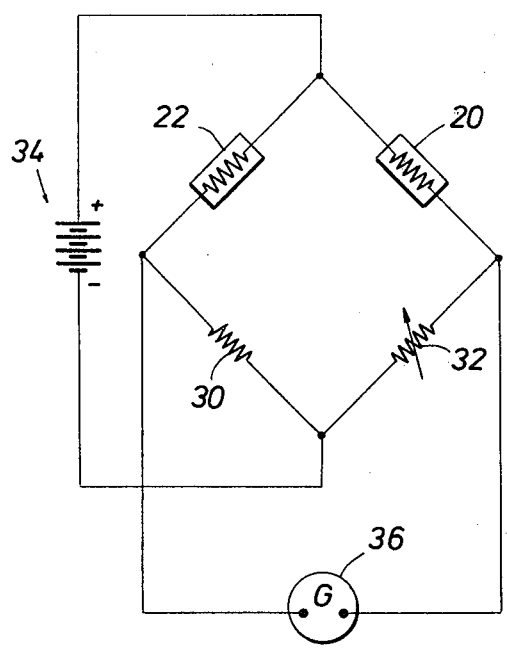
FIG. 3 is a circuit diagram of a Wheatstone bridge circuit for use with the present invention.

FIG. 3 illustrates one method for using the two strain gauges to determine the compressive membrane stress in the spherical shell segment. The two sensors 20, 22 are combined in a Wheatstone bridge circuit with known resistance 30, variable resistance 32, power supply 34 and galvanometer 36. Pressure forces acting on the sensor cause changes in the resistance of primary strain gauge 20. The amount of change can be determined by varying the resistance of variable resistance 32 until the galvanometer is zeroed. The change in resistance of primary gauge 20 may then be directly correlated to the pressure induced compressive strain in the shell using the known properties of gauge 20.

Primary strain gauge 20 will be subjected to changes in temperature. These temperature changes will cause thermal expansion or thermal contraction of the gauge, thereby causing the gauge to indicate a thermally induced strain which has no relation to the pressure acting on the sensor. Inaccuracies caused by temperature changes are eliminated by the presence of secondary strain gauge 22 which should be as nearly identical to primary strain gauge 20 as possible. Thus, thermally induced changes in the resistance of primary gauge 20 will be negated by equivalent changes in secondary gauge 22.

Figure 4:
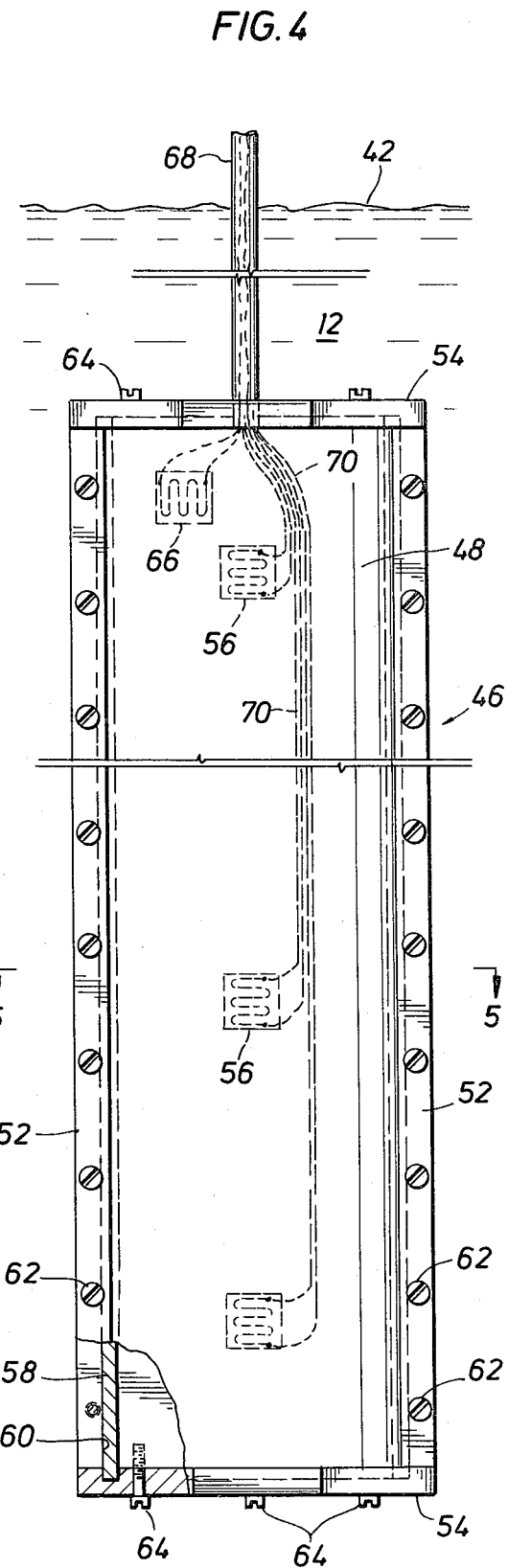
FIG. 4 is an elevational front view of a cylindrical thin shell pressure sensor in accordance with the present invention.
Figure 5:
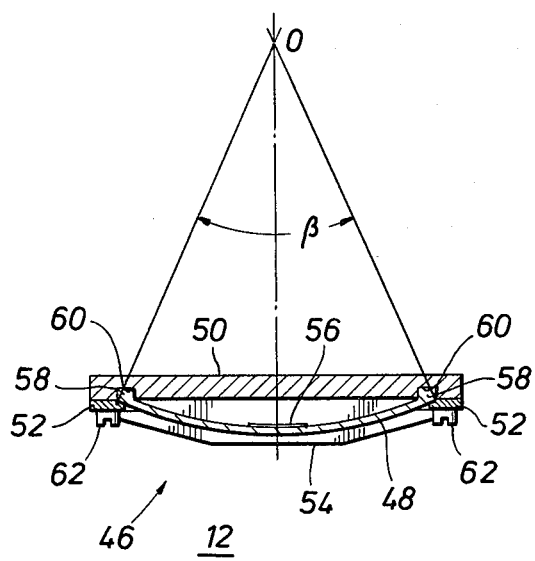
FIG. 5 is a cross-sectional top view of the cylindrical thin shell pressure sensor of FIG. 4 taken along line 5—5 of FIG. 4.

FIGS. 4 and 5 illustrate a cylindrical thin shell pressure sensor in accordance with the present invention. The cylindrical sensor consists essentially of cylindrical shell segment 48, rectangular base plate 50, two retaining bars 52, two end caps 54 and a plurality of strain gauges 56. As with the spherical sensor, the radius to thickness ratio of cylindrical shell segment 48 should be large. The length of the cylindrical segment is dependent on the particular application, however, as a general rule, the length should be at least equal to the width of the cylindrical segment. This is necessary in order to prevent edge effects from influencing the pressure reading. Preferably, the angle $\beta$ between two lines beginning at the cylindrical center (O) and proceeding to opposite outer edges of the outer surface of cylindrical shell segment 48 is from 30° to 60°, however, this angle may be as large as 180°.

Two shoulders 58 are formed integrally with the cylindrical shell segment 48 along its outer longitudinal edges. Two corresponding grooves 60, matable with shoulders 58, are formed in rectangular base plate 50. The cylindrical shell segment is attached to the base plate by two retaining bars 52 which overlap the longitudinal edges of cylindrical shell segment 48. A plurality of screws 62 are used to attach the retaining bars to the base plate.

In order to prevent moisture from getting into the interior of the cylindrical sensor, the ends must be capped. One method of doing so is illustrated in FIGS. 4 and 5. The shell segment extends a short distance beyond the ends of rectangular base plate 50. Two end caps 54 having a trapezoidal shape are attached to the ends of the base plate by a plurality of screws 64. Each end cap has a curved groove corresponding to the cross sectional shape of cylindrical shell segment formed in its inner face. The cylindrical shell extends into this groove thereby sealing the ends of the sensor.

A plurality of wire resistance strain gauges 56 are attached to the interior face of the cylindrical shell segment along a longitudinal line through the apex of the segment. Preferably, these gauges should be oriented so as to measure strains perpendicular to the longitudinal axis of the cylindrical shell segment. In other words, the strain should be measured along a circumferential line. The gauges should be separated by a sufficient distance to prevent strain readings in one gauge from influencing the readings in adjacent gauges. Normally, a spacing approximately equal to the width of the sensor will be sufficient. A temperature compensating strain gauge 66, as described above, mounted to the interior surface of rectangular base plate 50 may be used to negate temperature induced effects in the readings of gauges 56. A hole is formed in the upper end cap and tube 68 is inserted therein. Tube 68 extends upwardly through the surface 42 of the embedding medium 12. Wires 70 which transmit the input and output electrical signals to the gauges runs from the gauges, through tube 68 and connect to a remote readout device (not shown) on the surface 42.

The cylindrical sensor is inserted in the embedding medium with its longitudinal axis vertical. Thus, the various gauges 56 will read pressures at varying depths. This data can be vitally important in determining whether the ice sheet, as a whole, is being subjected to bending.

In addition to the spherical and cylindrical thin shell embodiments of this invention discussed above, other thin shells may be used. For example, any shell of revolution would be suitable for use with the present invention in place of the spherical shell. A shell of revolution is one obtained by rotating any plane curve about an axis lying in the plane of the curve. Thus, for example, a segment of a paraboloid of revolution could be used in place of the spherical thin shell segment. Similarly, the cylindrical thin shell segment may be replaced by any longitudinal thin shell having a symmetrical cross section. A longitudinal thin shell is defined as one having a uniform cross section at any point along its longitudinal axis. Thus, a longitudinal thin shell having a uniform elliptical segment cross section may be used in place of the cylindrical shell.

As will be discussed below, for a large area near the apex, membrane stresses in thin shells are insensitive to direction of loading. Only the normal component of the load will cause membrane stresses. The normal component of the load is defined as the component which is perpendicular to the surface of the shell at its apex. The tangential component of the load does not cause appreciable membrane stress and is reacted at the edges of the shell. Therefore, a thin shell pressure sensor which measures pressure by sensing membrane stress will measure only the normal component of the pressure in the embedding medium.

In order to determine the overall direction and magnitude of the pressure forces it is preferable to use a cluster of sensors as shown in FIG. 6. Three thin shell sensors 72, 74 and 76 are embedded in medium 12. The two outer sensors 72 and 76 are oriented so that normal lines through their apexes are mutually perpendicular. Sensor 74 is located between outer sensors 72 and 76 so that a normal line through its apex forms a 45° angle with each of the normal lines through the apexes of outer sensors 72 and 76. The pressure within medium 12 is represented by P. For purposes of illustration it will be assumed that P acts as a point load on the apex of each sensor as shown in FIG. 6. In reality, P acts as a distributed load over the surface of the sensor. Sensors 72, 74 and 76 will read only the normal components of P, indicated by P72, P74 and P76 respectively. The overall magnitude and direction of the pressure load, P, may be determined by vectorily adding P72 and P76. The accuracy of the result may be verified by mathematically determining the magnitude of the pressure along a line normal to sensor 74 and comparing that figure with P74. In an alternative embodiment, the three sensors 72, 74 and 76 may be integrally mounted to one handling frame for ease of installation.

Due to its compact size and versatility, the pressure sensor of the present invention may be used in a wide variety of applications. It may be used to determine soil pressure forces for use in designing roads, bridges and other structures. Alternatively, it may be used to aid in the design of bulk storage facilities. In Arctic operations the sensor may be used to gather environmental data necessary to proper design of offshore structures and artificial islands. It may also be used to continuously monitor ice pressure forces near existing structures and islands. Still another use would be to determine the forces acting on the hull of an icebreaking vessel. Other uses will be apparent to those skilled in the art.

THEORY

Although quite complex, the theory of membrane stresses in a thin shell is well known. See, for example, Billington, D. P., "Thin Shell Concrete Structures", McGraw-Hill Book Company, 1965; Timoshenko, S. P., and S. Woinowsky-Krieger, "Theory of Plates and Shells", 2nd ed., McGraw-Hill Book company, 1959; and Roark, R. J., "Formulas for Stress and Strain", 3rd ed., McGraw-Hill Book Company, 1954. The theory will not be developed herein. Only the principles and conclusions on which the present invention is based will be presented.

The theory will be discussed with reference to the spherical thin shell segment shown in FIG. 7. A similar analysis could be performed for a cylindrical thin shell segment or for any other thin shell. As best shown in FIG. 7B, the shell segment is defined by radius R, thickness t and cone angle $\alpha$. The circumferential radius of the segment is indicated by r. Initially, it will be assumed that the segment is subjected to a uniform normal pressure p.

The membrane stresses in the spherical shell segment may be determined by isolating a small element 78 of the shell. Element 78 is bounded by two meridional lines 80, 82 and two concentric circles 84, 86 as best shown in FIG. 7A. The angular location of element 78 is defined by the angle $\phi$ shown in FIG. 7B. Under membrane theory, all stresses which act on element 78 act within the shell. No transverse stresses are present. Additionally, due to the symmetry of the shell, there are no shear stresses present. Thus, the only membrane stresses which result from application of pressure p are meridional membrane stress $S_1$ and hoop membrane stress $S_2$, as shown in FIGS. 7A and 7C.

For a spherical thin shell segment, the magnitudes of $S_1$ and $S_2$ may be calculated from the following formulas:

$$S_1 = (-rp/t)\left(\frac{1}{1 + \cos\phi}\right)$$

$$S_2 = (rp/t)\left(\frac{1}{1 + \cos\phi} - \cos\phi\right)$$

See, Roark, R., J., "Formulas for Stress and Strain", 3rd ed., p. 273, example 16. For $\phi = 0°$ (apex of shell), both of the above formulas reduce to $$S_1 = S_2 = (-r/2t)p$$

The minus sign indicates that the stress is compressive. Rearranging, $$p = \frac{-2t}{r}(S_1) = \frac{-2t}{r}(S_2)$$

Thus, it can be seen that pressure is equal to stress times a geometry dependent factor.

As $\phi$ increases, meridional stress $S_1$ remains relatively constant. For example, at $\phi = 20°$, $S_1 = -0.5155$ (rp/t). On the other hand, at $\phi = 20°$, $S_2 = -0.4241$ (rp/t). The change in meridional stress is only approximately 3% while the hoop stress has changed about 15%. This illustrates why it is preferable to orient the strain gauges along a meridional line. Small inaccuracies in location will not appreciably affect the result. However, as $\phi$ approaches $\alpha$, membrane theory becomes inaccurate. Bending stresses resulting from the shell edge restraint will be present. These bending stresses damp out within a short distance from the edge. Therefore, the strain gauge should be located at a point where it will not be influenced by these edge effects. The best location is at the apex of the shell.

Not all pressure loads will be normal to the sensor. However, any pressure load may be resolved into a normal component of pressure and a side component. It has been shown that side loads on spherical shells do not result in any appreciable membrane stresses near the apex of the shell. See, Billington, D. P., "Thin Shell Concrete Structures", section 2-3, pp. 51 to 56. Since the side component of the pressure load does not cause membrane stress near the apex, it is clear that regardless of the direction of pressure loading, only the normal component will be measured by a thin shell sensor.

Under membrane theory no stresses result from temperature induced volume changes of the shell. See, for example, Billington, D. P., "Thin Shell Concrete Structures", p. 70. These volume changes will, however, cause a temperature induced reading in the primary strain gauge. This reading may be eliminated mathematically. Alternatively, a secondary gauge may be used, as described above, to negate these readings.

The above discussion of membrane theory is presented only to illustrate the mechanism by which the pressure sensor of the present invention operates. Some deviation from the results predicted by membrane theory may occur due to such factors as adhesion of the ice to the outer surface of the thin shell or differential temperature effects on the two strain gauges. Such deviations, however, should be within acceptable limits.

The invention and the best mode contemplated for practicing the invention have been described. It should be understood that the foregoing is illustrative only and that other means and obvious modifications can be employed without departing from the true scope of the invention defined in the following claims. For example, the thin shell need not be spherical or cylindrical. Any shell formed by rotating a plane curve about an axis in the plane of the curve may be used. Alternatively, any longitudinal thin shell having a uniform cross section may be used. Also, other means for measuring the membrane stress may be employed.

What I claim is:

1. A thin shell pressure sensor for measuring in situ pressures in a medium in which the sensor is placed, said sensor comprising:
   a substantially flat base plate;
   a thin shell segment defining a curved surface bounded at a peripheral edge, said curved surface having an apex relatively distal on said curved surface from said peripheral edge, said thin shell segment attached to said base plate along said peripheral edge so as to form an enclosed chamber between said base plate and said thin shell segment, said thin shell segment being elastic and substantially rigid; and
   means for sensing membrane stresses in said thin shell segment at a position proximate said apex, said membrane stresses being caused by said in situ pressure of said medium.

2. The thin shell pressure sensor of claim 1 wherein said thin shell segment is a segment of a spherical shell.

3. The thin shell pressure sensor of claim 2 wherein said sensing means is adapted for monitoring stress along a line on said spherical shell segment, said line directly joining the apex of said spherical shell segment and a point on said peripheral edge.

4. The thin shell pressure sensor of claim 1 wherein said thin shell segment is a segment of a cylindrical shell.

5. The thin shell pressure sensor of claim 4 wherein said sensing means includes a plurality of strain gauges, each being positioned proximate the longitudinally extending apex of said thin cylindrical shell segment, said strain gauges being longitudinally spaced one from the other along said apex.

6. The thin shell pressure sensor of claim 5 wherein said strain gauges are each adapted for monitoring strain in a direction on said thin cylindrical shell segment substantially perpendicular to said longitudinally extending apex.

7. The thin shell pressure sensor of claim 1 wherein said means for sensing membrane stresses in said thin shell segment is a wire resistance strain gauge attached to the interior surface of said thin shell segment.

8. The thin shell pressure sensor of claim 7 wherein said pressure sensor further comprises a secondary, temperature compensating wire resistance strain gauge attached to the interior surface of said base plate.

9. The thin shell pressure sensor of claim 1 wherein said means for sensing membrane stress is adapted for monitoring stress along a line joining said sensing means and that portion of said peripheral edge nearest said sensing means.

10. The thin shell pressure sensor of claim 1 wherein said thin shell segment is a shell of revolution having a symmetrical cross section.

11. The thin shell pressure sensor of claim 1 wherein said thin shell segment is metallic and is sufficiently rigid to resist buckling in response to said thin shell pressure sensor being utilized for monitoring the pressure exerted by a mass of ice on a stationary structure.

12. A thin shell pressure sensor for measuring in situ pressures in a medium in which the sensor is embedded, said sensor comprising:
   a substantially flat base plate having an annular groove formed on one face thereof;
   a spherical thin shell segment having an apex, a peripheral edge and an annular shoulder formed along said peripheral edge, said annular shoulder matable with said annular groove so as to form an enclosed chamber between said base plate and said spherical thin shell segment;
   an annular retaining ring attached to said base plate by a plurality of screws, said annular retaining ring having an inside diameter slightly less than the outside diameter of said spherical shell segment so that said annular retaining ring overlaps the periphery of said spherical shell segment thereby firmly attaching said spherical shell segment to said base plate;
   a primary wire resistance strain gauge attached to the interior surface of said spherical shell segment at or near said apex of said spherical shell segment;
   a secondary, temperature compensating wire resistance strain gauge attached to the interior surface of said base plate; and
   means for detecting and recording the outputs of said primary and secondary strain gauges.

13. The thin shell pressure sensor of claim 12 wherein said spherical thin shell segment has a cone angle of from 15° to 30°.

14. The thin shell pressure sensor of claim 12 wherein said base plate has a thickness substantially greater than the thickness of said spherical thin shell segment.

15. The thin shell pressure sensor of claim 12 wherein said means for detecting and recording the outputs of said primary and secondary strain gauges comprises:
   an input power supply;
   a Wheatstone bridge circuit having said primary strain gauge and a variable resistance in one leg thereof and said secondary strain gauge and a fixed resistance in the other leg; and
   a galvanometer for detecting the output current of said Wheatstone bridge circuit.

16. A thin shell pressure sensor for measuring in situ pressures in a medium in which the sensor is embedded, said sensor comprising:
   a substantially flat rectangular base plate having two longitudinal grooves formed on one face thereof, said grooves being substantially parallel to each other;
   a cylindrical thin shell segment having a longitudinal apex, two peripheral edges and two shoulders matable with said grooves formed along said peripheral edges, the length of said cylindrical thin shell segment being slightly longer than the length of said rectangular base plate so that both ends of said cylindrical segment extend a short distance beyond the ends of said base plate;

two retaining bars attached to the longitudinal edges of said base plate by a plurality of screws so as to overlap the longitudinal peripheral edges of said cylindrical thin shell segment;

two end caps attached to the longitudinal ends of said base plate by a second plurality of screws, said end caps having a curved groove matable with the longitudinal ends of said cylindrical thin shell segments formed on the inner face thereof; and one or more wire resistance strain gauges attached to the inner surface of said cylindrical thin shell segment, said strain gauges attached at or near the apex of said segment and oriented so as to measure circumferential strain.

17. The thin shell pressure sensor of claim 16 further comprising a secondary, temperature compensating strain gauge attached to the inner surface of said base plate.

18. The thin shell pressure sensor of claim 16 wherein said pressure sensor includes a plurality of wire resistance strain gauges attached to the inner surface of said cylindrical thin shell segment along a longitudinal line through the apex of said shell segment and wherein said pressure sensor is embedded in said medium with its longitudinal centerline vertical so that said sensor will detect and measure bending stresses in said medium.

* * * * *